(12) United States Patent
Gustafsson

(10) Patent No.: US 8,061,145 B2
(45) Date of Patent: Nov. 22, 2011

(54) ARRANGEMENT FOR PROPELLING AN AIRCRAFT, AIRCRAFT AND OUTLET NOZZLE FOR A JET ENGINE

(75) Inventor: Bernhard Gustafsson, Göteborg (SE)

(73) Assignee: Volvo Aero Corporation, Trollhattan (SE)

( * ) Notice: Subject to any disclaimer, the term of this patent is extended or adjusted under 35 U.S.C. 154(b) by 879 days.

(21) Appl. No.: 12/067,112

(22) PCT Filed: Sep. 27, 2005

(86) PCT No.: PCT/SE2005/001430
§ 371 (c)(1),
(2), (4) Date: Mar. 17, 2008

(87) PCT Pub. No.: WO2007/037725
PCT Pub. Date: Apr. 5, 2007

(65) Prior Publication Data
US 2008/0236138 A1    Oct. 2, 2008

(51) Int. Cl.
*F02K 1/00* (2006.01)
(52) U.S. Cl. ............. 60/770; 60/226.1; 239/265.11
(58) Field of Classification Search .......... 60/770, 60/226.1, 262, 771; 239/265.19, 265.33, 239/265.37, 265.39, 265.11; 181/213
See application file for complete search history.

(56) References Cited

U.S. PATENT DOCUMENTS

| | | | | |
|---|---|---|---|---|
| 2,635,420 A * | 4/1953 | Jonker | ............... | 60/226.1 |
| 3,035,791 A * | 5/1962 | Klapproth | ............... | 244/12.5 |
| 3,035,792 A * | 5/1962 | Klapproth | ............... | 244/23 R |
| 3,210,934 A * | 10/1965 | Smale | ............... | 60/265 |
| 3,693,880 A | 9/1972 | Versaw et al. | | |
| 3,769,797 A * | 11/1973 | Stevens | ............... | 60/226.1 |
| 3,981,448 A * | 9/1976 | Demogenes et al. | ...... | 239/127.3 |
| 4,002,024 A * | 1/1977 | Nye et al. | ............... | 60/262 |
| 4,007,587 A * | 2/1977 | Banthin et al. | ............... | 60/204 |
| 4,018,046 A * | 4/1977 | Hurley | ............... | 60/264 |
| 4,026,472 A | 5/1977 | Rabone | | |
| 4,080,785 A * | 3/1978 | Koff et al. | ............... | 60/226.3 |
| 4,215,537 A * | 8/1980 | Hurley | ............... | 60/264 |
| 5,155,993 A * | 10/1992 | Baughman et al. | ......... | 60/226.1 |
| 5,170,964 A * | 12/1992 | Enderle et al. | ............... | 244/52 |

(Continued)

FOREIGN PATENT DOCUMENTS

EP    0646720 A1    4/1995

OTHER PUBLICATIONS

International Search Report for corresponding International Application PCT/SE2005/001430.

(Continued)

*Primary Examiner* — William H Rodriguez
(74) *Attorney, Agent, or Firm* — WRB-IP LLP

(57) ABSTRACT

The invention relates to an arrangement for propelling an aircraft comprising a jet engine and an outlet nozzle arranged downstream of the jet engine. The jet engine is of a type which generates an internal core flow and an external fan flow. A part of the outlet nozzle has an internal surface which defines a gas duct for the fan flow. The aforementioned part of the outlet nozzle includes a wall structure that is arranged at a distance from the internal surface such that it separates the gas duct for the fan flow from an internal gas duct for the core flow.

22 Claims, 7 Drawing Sheets

U.S. PATENT DOCUMENTS

| | | | | |
|---|---|---|---|---|
| 5,184,459 A | * | 2/1993 | McAndrews | 60/226.3 |
| 5,287,697 A | * | 2/1994 | Johnson et al. | 60/226.3 |
| D350,722 S | * | 9/1994 | Figueroa | D12/345 |
| 5,435,127 A | * | 7/1995 | Luffy et al. | 60/204 |
| 5,577,381 A | * | 11/1996 | Eigenbrode et al. | 60/226.1 |
| 5,682,739 A | | 11/1997 | Weinstein et al. | |
| 5,699,662 A | | 12/1997 | Born et al. | |
| 6,021,637 A | * | 2/2000 | Scavo | 60/262 |
| 6,668,541 B2 | * | 12/2003 | Rice et al. | 60/207 |
| 6,694,723 B2 | * | 2/2004 | Ward | 60/232 |
| 7,134,271 B2 | * | 11/2006 | Baughman et al. | 60/226.1 |
| 7,188,467 B2 | * | 3/2007 | Johnson | 60/226.1 |
| 7,296,414 B2 | * | 11/2007 | Stretton et al. | 60/797 |
| 7,341,225 B2 | * | 3/2008 | Stretton et al. | 244/54 |
| 7,395,657 B2 | * | 7/2008 | Johnson | 60/226.1 |
| 7,475,548 B2 | * | 1/2009 | Toffan et al. | 60/771 |
| 7,581,382 B2 | * | 9/2009 | Sadil et al. | 60/232 |
| 7,681,399 B2 | * | 3/2010 | Orlando et al. | 60/770 |
| 7,753,311 B2 | * | 7/2010 | Gustafsson | 244/53 R |
| 7,784,284 B2 | * | 8/2010 | Brunet et al. | 60/770 |
| 7,784,285 B2 | * | 8/2010 | Viswanathan | 60/770 |
| 2005/0091963 A1 | * | 5/2005 | Li | 60/262 |
| 2005/0091982 A1 | * | 5/2005 | Renggli et al. | 60/770 |
| 2007/0144141 A1 | * | 6/2007 | Roberge et al. | 60/226.1 |
| 2007/0186535 A1 | * | 8/2007 | Powell et al. | 60/226.1 |
| 2008/0016872 A1 | * | 1/2008 | Toffan et al. | 60/770 |
| 2008/0016873 A1 | * | 1/2008 | Harefors | 60/770 |
| 2009/0255269 A1 | * | 10/2009 | Petty et al. | 60/771 |

OTHER PUBLICATIONS

International Preliminary Report on Patentability for corresponding International Application PCT/SE2005/001430.

* cited by examiner

ARRANGEMENT FOR PROPELLING AN AIRCRAFT, AIRCRAFT AND OUTLET NOZZLE FOR A JET ENGINE

BACKGROUND AND SUMMARY

The present invention relates to an arrangement for propelling an aircraft comprising a jet engine and an outlet nozzle arranged downstream of the jet engine, the jet engine being of a type which generates an internal core flow and an external fan flow, a part of the outlet nozzle having an internal surface which defines a gas duct for the fan flow. The invention also relates to a correspondingly executed outlet nozzle.

The expression "core flow" is used here to denote a radial inner gas flow which originates from the combustion chamber of the jet engine. The core flow accordingly has a high energy content. The expression "fan flow" is used here to denote a radial outer gas flow (air flow) which flows in an outer duct in the jet engine, which extends from a front fan in the jet engine and past the combustion chamber. The fan flow is also known as the bypass flow. The jet engine is thus of the double-flow type.

Previously disclosed is the protection of an aircraft against possible attack by giving the aircraft a low so-called signature. The expression signature in this context denotes contrast against the background. An aircraft should, for example, have a low signature in respect of infrared radiation (IR) and radar. Hot structures and warm exhaust gases give rise to an IR signature. Metallic' surfaces of the jet engine, such as turbine parts, can give rise to an IR signature when they become hot during operation of the jet engine.

The present invention is intended for a propulsion arrangement for an aircraft that is designed to achieve a low signature. One way of achieving a low IR signature is to execute the outlet nozzle so that the aforementioned internal parts of the jet engine, which are hot during operation, are at least substantially concealed from view from the rear through the outlet of the outlet nozzle.

The core flow and the fan flow emerging from the jet engine move in a direction essentially parallel to the axial direction of the jet engine. According to a previously disclosed outlet nozzle, its gas duct has a form which curves in relation to the axial direction of the jet engine in such a way that the aforementioned parts of the jet engine that are hot during operation are concealed from view from the rear. According to another previously disclosed outlet nozzle, the cross section of the gas duct is transformed from a circular form at the inlet to the outlet nozzle into an elongated elliptical form at the outlet from the outlet nozzle. According to these examples, the axial gas flow emerging from the jet engine will be affected.

In an outlet nozzle having such a form of the gas duct, cold and hot bands can appear on the external metallic surfaces of the outlet nozzle due to the fact that the hot core flow displaces the fan flow in the area of the curve or the change in the cross-sectional form. Such hot bands lead to an increased risk of detection as a consequence of an increased IR signature. Cold and hot bands can also give rise to thermal stresses in the nozzle.

It is desirable to reduce any infrared radiation given off by the aircraft during flight, which remedies the above problem of cold and hot bands on the surfaces of the outlet nozzle.

This is achieved, therefore, with an arrangement for propelling an aircraft comprising a jet engine and an outlet nozzle arranged downstream of the jet engine, the jet engine being of a type which generates an internal core flow and an external fan flow, a part of the outlet nozzle having an internal surface which defines a gas duct for the fan flow, characterized in that the said part of the outlet nozzle comprises a wall structure that is arranged at a distance from the internal surface such that it separates the gas duct for the fan flow from an internal gas duct for the core flow.

The above-mentioned problem of cold and hot bands on the surfaces of the outlet nozzle is particularly pronounced when the internal surface exhibits a form such that at least one part of the fan flow is deflected.

According to a preferred embodiment, the wall structure is tubular and has an extent in the axial direction of the outlet nozzle. The wall structure is preferably also of the single-wall type, appropriately having the character of an internal shell or sleeve.

According to another preferred embodiment, the wall structure comprises at least one through hole from the gas duct for the fan flow to the gas duct for the core flow for the purpose of cooling the wall structure.

With a hole configuration of this kind, the temperature of the wall structure is reduced and with it its IR signature.

According to a further development of the previous embodiment, the wall structure is so arranged that a cross-sectional area through the gas duct for the fan flow reduces successively in the direction of the outlet from the outlet nozzle. The quantity of fan air that is forced into the cooling openings in the wall structure is increased in this way, with an associated further reduction in the temperature and the IR signature of the wall structure.

According to another preferred embodiment, the wall structure is designed to absorb thermal loadings, and a structural part which comprises the internal surface that defines the fan duct is designed to absorb mechanical loadings during operation. This offers possibilities for utilizing lighter materials, such as composites, in the external wall/sleeve of the outlet nozzle.

This is achieved, therefore, with an outlet nozzle for a jet engine arranged for positioning downstream of the jet engine, the outlet nozzle comprising a duct for conducting a gas emerging from the jet engine, which duct exhibits a gas inlet and a gas outlet, in conjunction with which one part of the outlet nozzle has an internal surface which defines the gas duct, characterized in that the aforementioned part of the outlet nozzle comprises a wall structure that is arranged at a distance from the internal surface such that it separates an external gas duct in a radial direction for a fan flow emerging from the jet engine from an inner gas duct in a radial direction for a core flow emerging from the jet engine.

The above-mentioned problem of cold and hot bands on the surfaces of the outlet nozzle is particularly pronounced when the internal surface exhibits a form such that at least a proportion of the gas emerging from the jet engine is deflected.

Additional preferred embodiments and advantages of these can be appreciated from the following description, the figures and the claims.

BRIEF DESCRIPTION OF THE FIGURES

The invention is described below in greater detail with reference to the embodiments depicted in the accompanying drawings, in which.

DETAILED DESCRIPTION OF PREFERRED EMBODIMENTS

Figure 1:
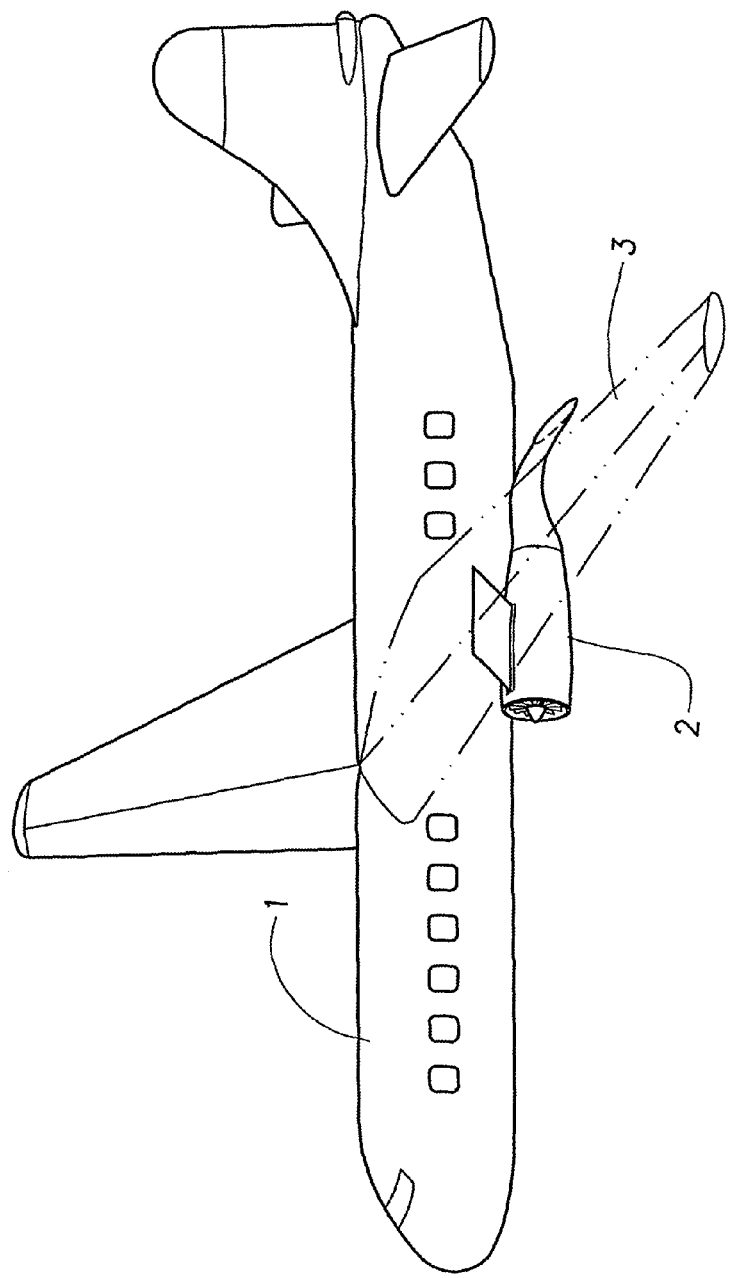
FIG. 1 illustrates schematically an aircraft containing an aircraft engine as a perspective view.

An aircraft 1 is depicted schematically in FIG. 1 as a perspective view. An arrangement 2 for propelling the aircraft 1 comprising a jet engine 4, see FIG. 2, is mounted under a wing 3.

Figure 2:
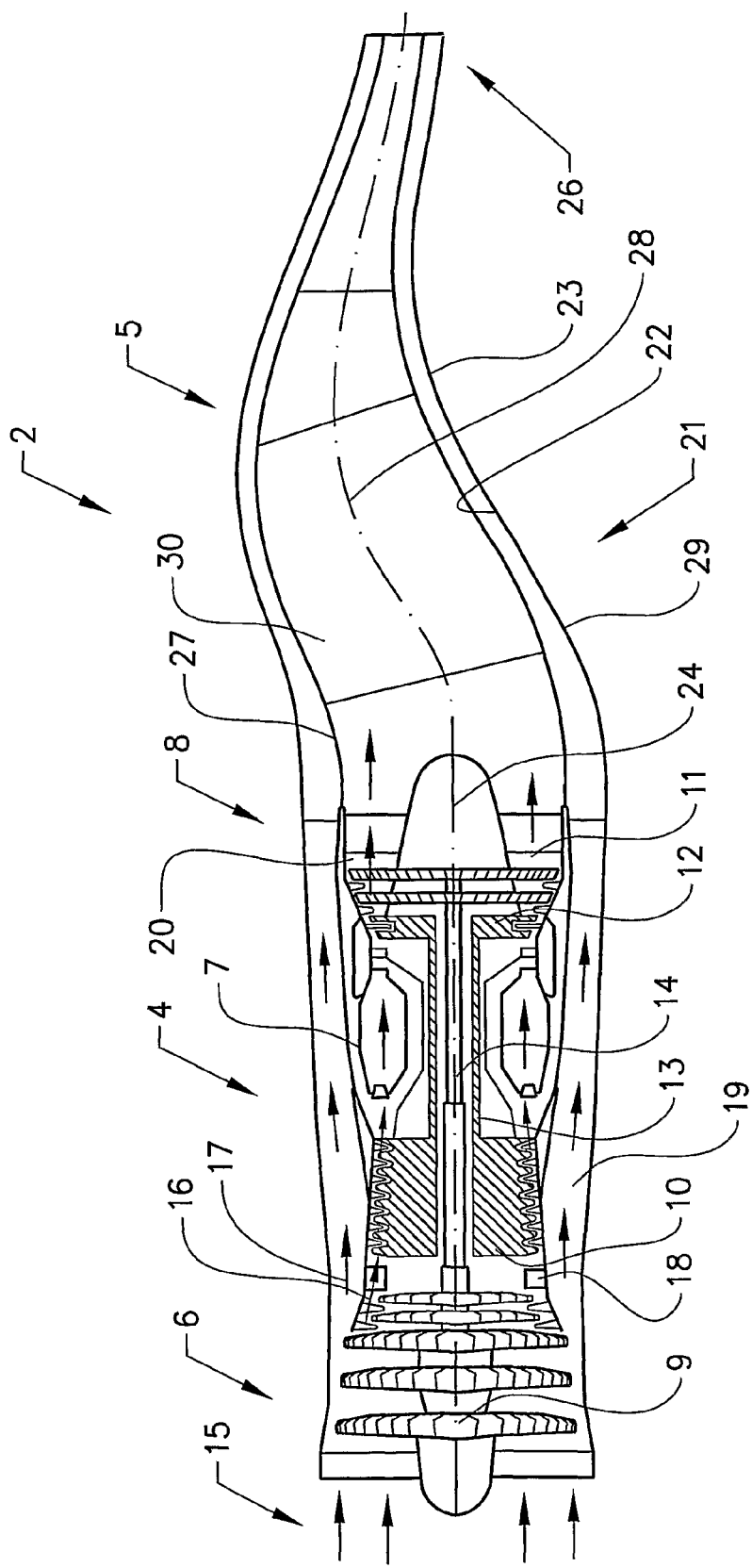
FIG. 2 illustrates the aircraft engine as a cross-sectional view.

The propulsion arrangement 2 is depicted in FIG. 2 as a cross-sectional view. The propulsion arrangement 2 comprises the jet engine 4 and an outlet nozzle 5 arranged downstream of the jet engine 4. The jet engine 4 is of the double-flow type and has double rotors.

The jet engine 4 comprises a compressor section 6 for compression of the incoming air, a combustion chamber 7 for combustion of the compressed air and a turbine section 8 arranged after the combustion chamber, which turbine section is rotationally connected to the compressor section in order to drive the latter with the help of the energy-rich gas from the combustion chamber. The compressor section 6 comprises a low-pressure part 9, or a fan, and a high-pressure part 10. The turbine section 8 comprises a low-pressure part 11 and a high-pressure part 12. The high-pressure compressor 10 is rigidly connected to the high-pressure turbine 12 via a first shaft 13 in such a way as to rotate with it, and the low-pressure compressor 9 is rigidly connected to the low-pressure turbine 11 via a second shaft 14 in such a way as to rotate with it. A high-pressure rotor and a low-pressure rotor are formed in this way. These are concentrically mounted and rotate freely in relation to one another.

As already stated, the jet engine 4 is of the double-flow type, which means that an incoming air flow 15 is divided, after it has passed through the fan 9, into two flows; an inner flow 16, being the compressor air flow, and an outer flow 17, being the fan air flow. For this purpose, the jet engine 4 includes a main duct 18, situated radially internally, for a primary flow to the combustion chamber 7, and a duct 19, situated radially externally, for a secondary flow (bypass for the fan flow). The gas ducts 18,19 are concentric and annular. The inner gas flow emerging from the jet engine 4 is referred to below as the core flow 20.

The fan flow 17 and the core flow 20 both emerge from the jet engine 4 in a direction essentially parallel to the axial direction 24 of the jet engine 4.

A part 21 of the outlet nozzle 5 has an internal surface 22 which defines a gas duct 23 for the fan flow, the internal surface having a form such that at least a part of the fan flow is deflected. The gas duct 23 of the outlet nozzle 5 is designed more specifically in such a way that the internal parts of the turbine, which are hot during operation, are concealed from direct view in a sector from the rear. This produces a reduced IR signature.

Figure 3:
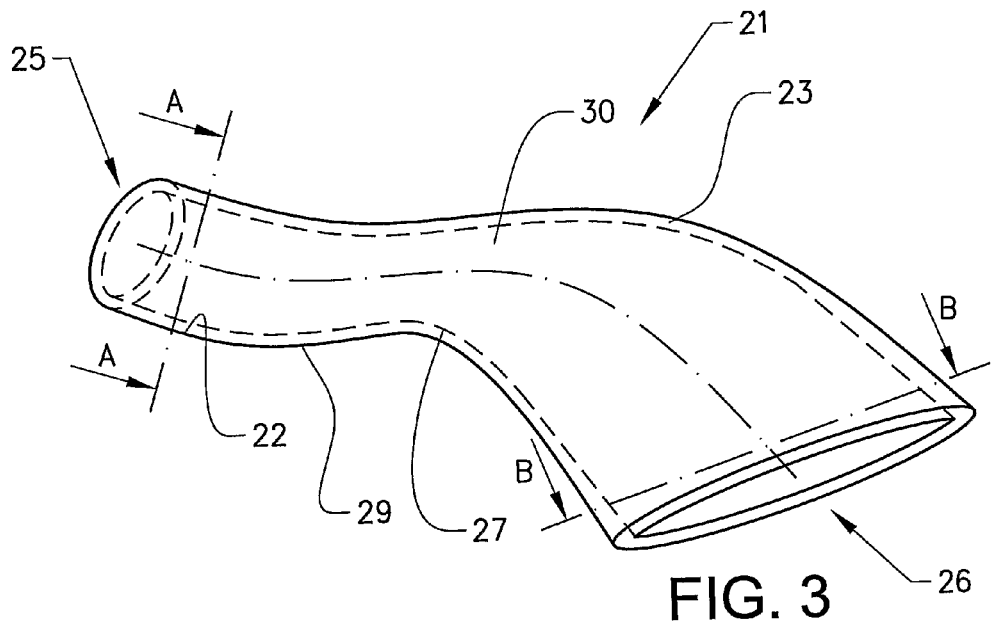
FIG. 3 illustrates an outlet nozzle according to a preferred embodiment as a perspective view.
Figure 4:
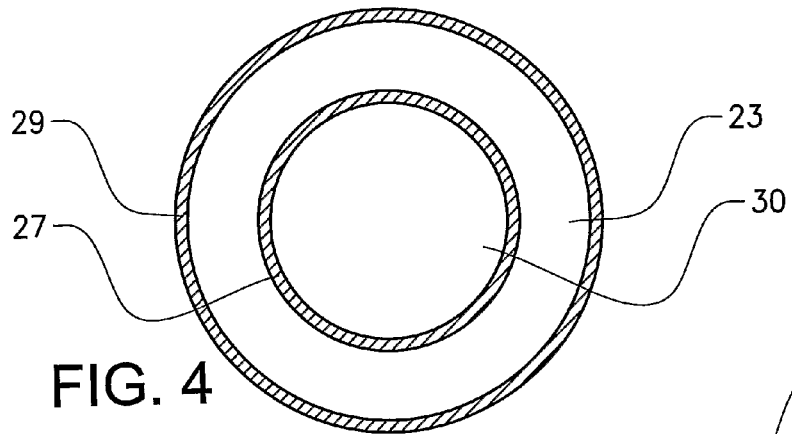
FIGS. 4 and 5 illustrate two different cross-sectional views of the outlet nozzle according to FIG. 3.
Figure 5:
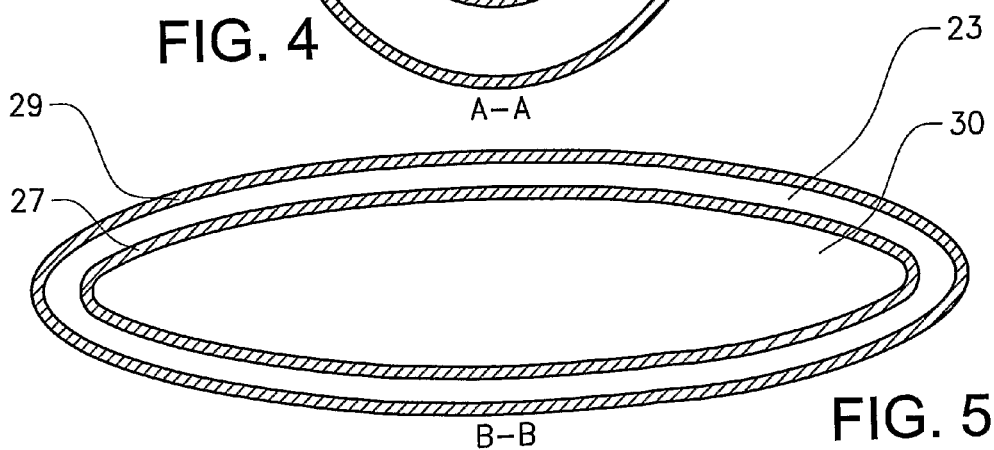

A cross section through the internal surface 22 of the part 21 of the outlet nozzle perpendicular to the axial direction 24 of the jet engine exhibits a different form in two mutually separate positions in the axial direction of the jet engine 4, see FIGS. 3-5. More precisely, the gas duct 23 has an essentially circular cross-sectional form at its upstream end 25 and an elongated, rounded form at its downstream end 26. More precisely, the gas duct 23 has an elliptical form. The gas duct 23 exhibits an essentially continuous transition from the circular form to the elongated, elliptical form.

The elongated form defines a long transverse axis and a short transverse axis of the gas outlet. The jet engine is also intended to be arranged in an aircraft preferably in such a way that the long transverse axis extends in the lateral sense of the aircraft, and the short transverse axis extends in the vertical sense of the aircraft. A large width/height ratio for the elongated form is advantageous from the point of view of the radar signature. The nozzle 5 has a greater width parallel to the aforementioned long transverse axis at the outlet 26 than the diameter of the circular form of the gas inlet at the gas inlet 25.

A cross section through the internal surface 22 of the part 21 of the outlet nozzle perpendicular to the axial direction 24 of the jet engine also has a different position in the vertical sense in two mutually separate positions in the axial direction of the jet engine, see FIG. 2. More particularly, the internal surface 22 of the part 21 of the inlet nozzle has a form which curves upwards and then downwards in the direction of the outlet 26.

As an alternative/complement to the above-mentioned execution, the deflection of the gas flow can also exhibit the same cross-sectional form, but of a different size, at two mutually separate positions in the axial direction of the jet engine.

The aforementioned part 21 of the outlet nozzle 5 comprises a wall structure 27 which is arranged at a distance from the internal surface 22 such that it separates the gas duct 23 for the fan flow from an internal gas duct 30 for the core flow 20. The wall structure 27 is tubular in form and exhibits an extent in the axial direction 28 of the outlet nozzle 5. The wall structure 27 is of the single-wall type and possesses the form of a tube, or a sleeve having a form which corresponds essentially to the form of the internal surface 22. A gap is accordingly formed between the tube 27 and the internal surface 22.

The surfaces which define the internal gas duct 30 for the core flow 20 should possess characteristics such that the reflection of radiation from hot component parts is avoided. The surface must accordingly be of a nature such that the radiation from hot component parts of the engine is counteracted in order to be reflected straight out without obstruction. The surfaces should accordingly have a low temperature and a high emissivity, including at shallow angles.

An external wall 29, or shell, of the outlet nozzle 5 is designed to absorb compressive forces during operation. The tube 27, which thus forms an inner shell, will experience stresses due to variations in temperature during operation and is designed in the first instance to absorb thermal forces. The tube 27 can also be designed to absorb a certain compressive loading. In other words, the outlet nozzle 5 is designed in such a way that the two functions for withstanding forces are divided. This offers possibilities for the external shell 29 to be formed from a lighter material, such as a composite material.

Figure 6:
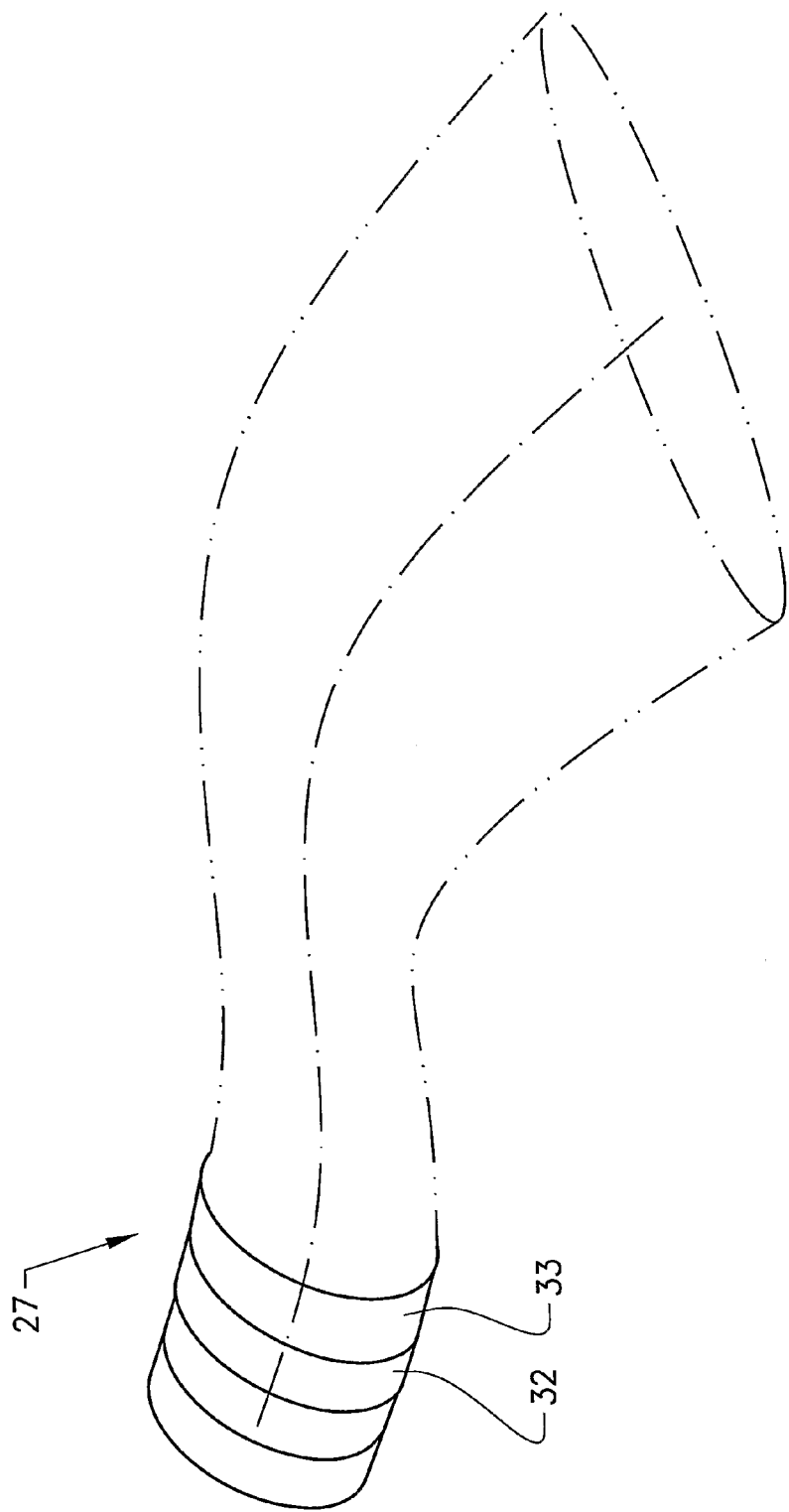
FIG. 6 illustrates a cut-away cross-sectional view of a wall structure included in the outlet nozzle according to a first embodiment.
Figure 7:
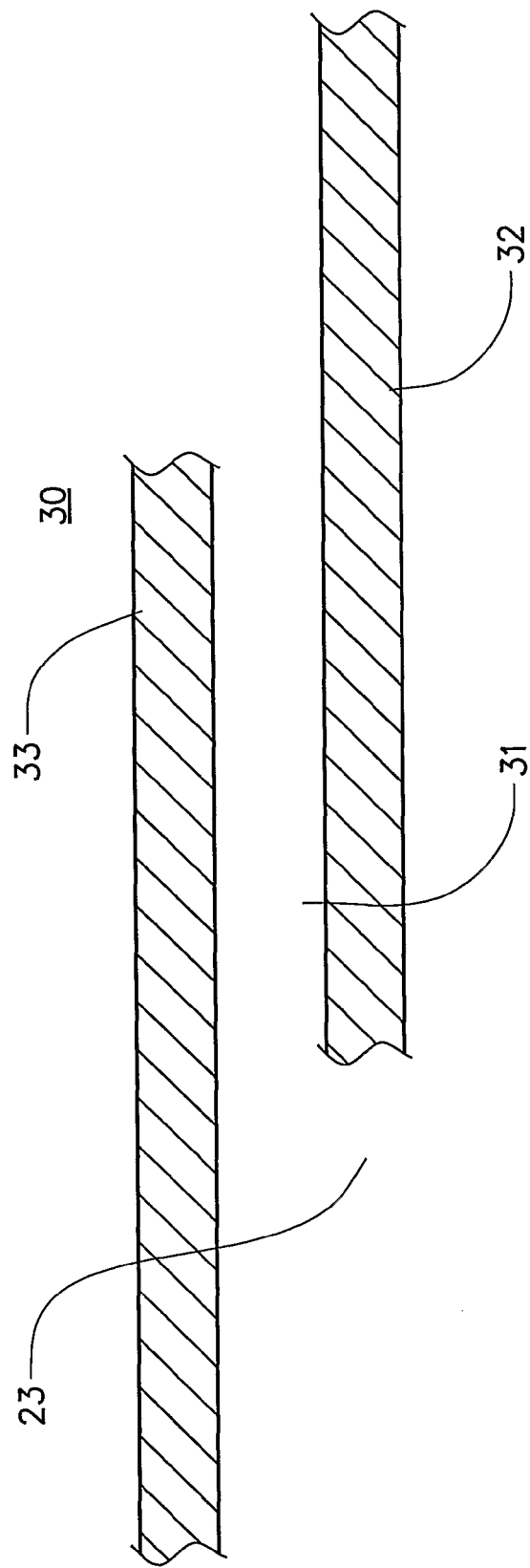
FIG. 7 illustrates the hole configuration of the wall structure according to FIG. 6.

The wall structure 27 comprises at least one through hole 31 from the gas duct 23 for the fan flow to the internal gas duct 30 for the core flow 20 for the purpose of cooling the wall structure; see FIGS. 6 and 7. The wall structure 27 is executed according to this embodiment with a plurality of sleeves 32, 33, which lie with a certain overlap relative to one another in the axial direction 28 of the outlet nozzle 5. Annular gaps are formed in this way, which connect the duct 23 for the fan flow to the duct 30 for the core flow.

The wall structure 27 has an extent such that its external surface is essentially parallel to the internal surface 22 of the outlet nozzle part. The wall structure 27 nevertheless has a form such that a cross-sectional area through the gas duct 23 for the fan flow reduces successively in the direction of the outlet 26 of the outlet nozzle; see the cross-sectional views A-A in FIG. 4 and B-B in FIG. 5. Thanks to the fact that the cross-sectional area of the gas duct 23 for the fan flow reduces in the direction of the outlet 26, the fan flow can be forced in through the holes 31, and the wall structure 27 is thus cooled effectively. Accordingly, a higher pressure is present in the fan duct 23 than in the core flow duct 30, which pressure forces a part of the fan flow through the holes 31 to the core flow duct 30.

Figure 8:
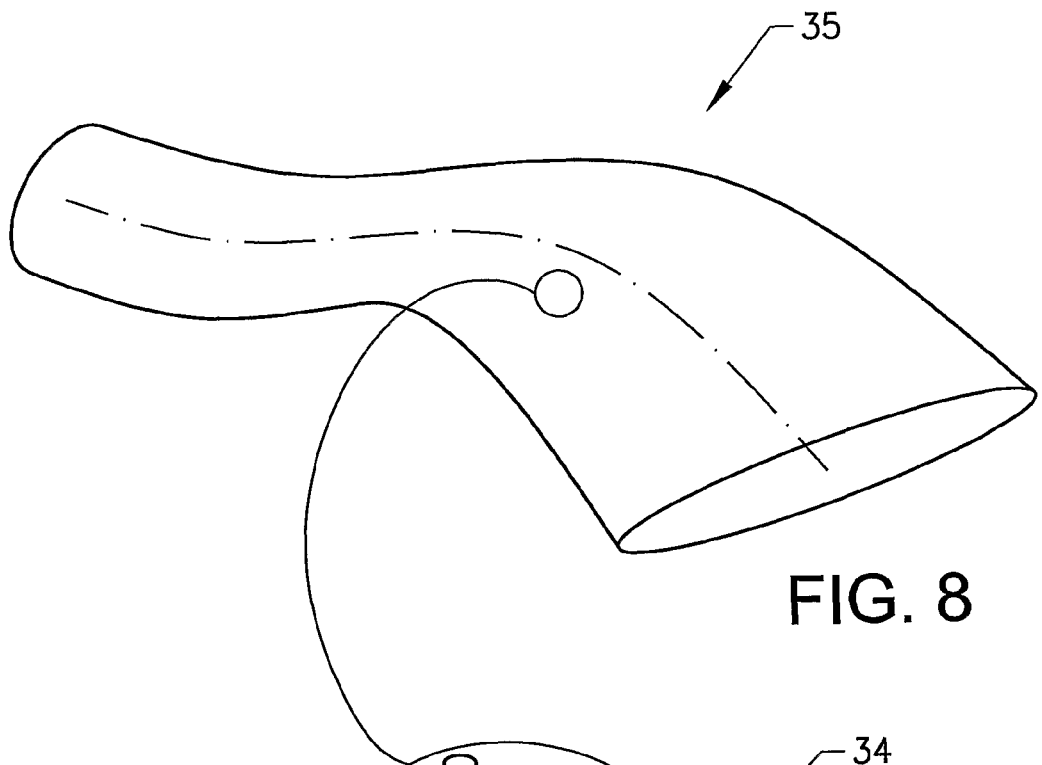
FIG. 8 illustrates a cut-away cross-sectional view of a wall structure included in the outlet nozzle according to a second embodiment.
Figure 9:
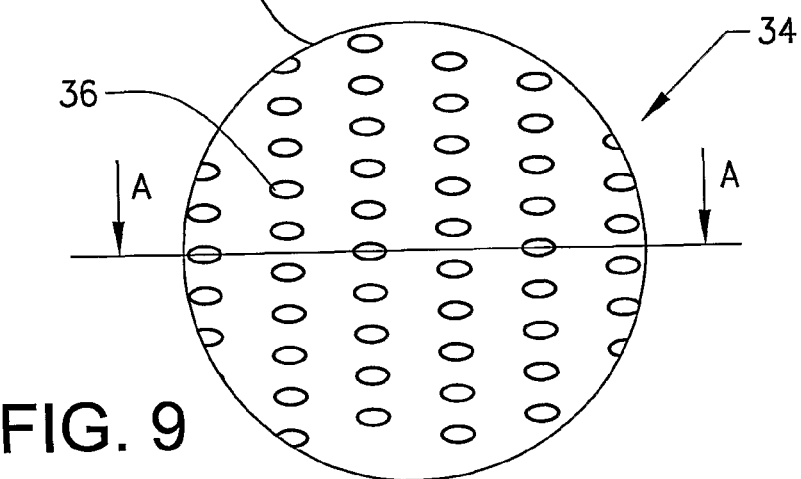
FIGS. 9 and 10 illustrate the hole configuration of the wall structure according to FIG. 8.
Figure 10:
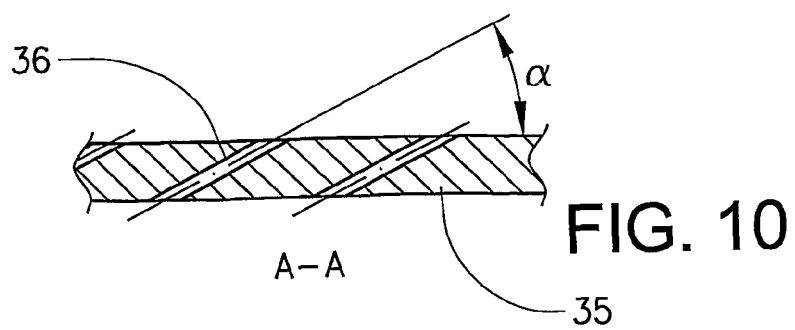

An alternative embodiment of an hole configuration 34 in a wall structure 35 is depicted in FIGS. 8-10. A plurality of discrete holes 36 extends through the wall structure 35. In the depicted example, a plurality of rows of holes is executed through the wall structure. The holes 36 also extend at an acute angle a through the wall structure 35; see FIG. 10.

Figure 11:
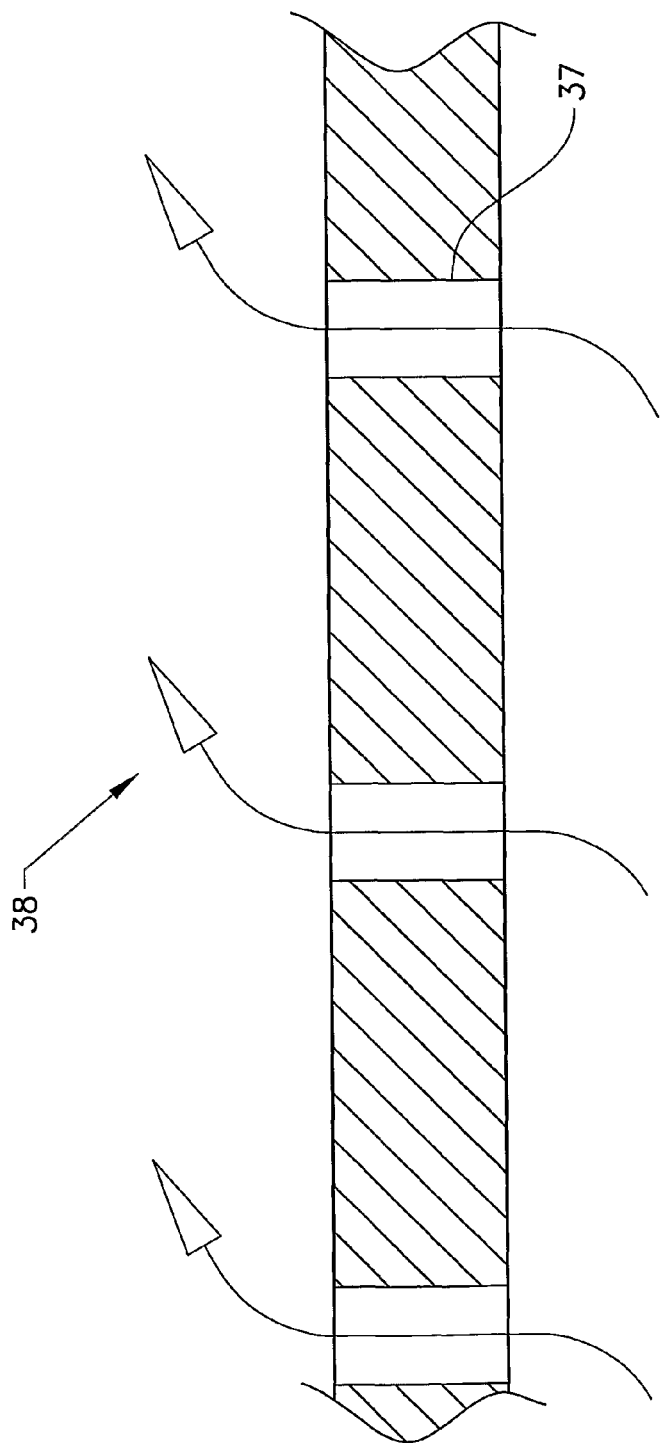
FIG. 11 depicts an alternative hole configuration in relation to FIG. 9.

Depicted in FIG. 11 is an alternative embodiment of a wall structure 38 in relation to FIG. 10. In this case, a plurality of holes 37 is arranged essentially perpendicularly to the direction of extension of the wall structure 38.

The expression "jet engine" is used above to denote different types of engine which take in air at a relatively low velocity, heat it up by combustion, and eject it at a very much higher velocity. The invention also relates to a jet engine of the double-flow type, that is to say a turbofan engine.

The invention must not be regarded as being restricted to the illustrative embodiments described above, and a series of further variants and modifications are conceivable within the scope of the following patent claims.

The invention can, of course, be utilized for types of aircraft other than that indicated in FIG. 1. The jet engine of the aircraft can be positioned centrally in the fuselage of the aircraft.

The jet engine depicted in FIG. 2 must be regarded only as an exemplifying application of the invention.

According to an alternative to the gas duct in FIG. 5 having an elliptical form at the outlet, it may possess a different elongated, rounded form, such as a concave-convex structure, where a first long side of the gas duct has a convex form and a second, opposite long side of the gas duct has a concave form, or vice versa. The opposite long sides of the gas duct may be essentially parallel, for example.

According to an alternative to the wall structure in the gas duct of the outlet nozzle being of the single-wall type, the gas duct can comprise a plurality of preferably parallel walls, appropriately two in number. It is possible to utilize a so-called sandwich structure, for example. The sandwich structure comprises two parallel, tubular walls together with a plurality of struts, or dividing walls, which maintain a distance between the parallel walls. A sandwich structure of this kind can be advantageous for absorbing compressive loadings.

According to a further development of the present alternative, the sandwich structure is of a type such that ducts are formed between the walls. It is then possible to conduct a cooling medium, preferably a cooling fluid, through the ducts in order to effect the cooling. The cooling fluid (for example water) is then pumped round, cooled, and condensed in a heat exchanger in one or other available cold air flow that is present in the aircraft.

According to an alternative for the form of the outlet nozzle depicted in FIG. 2, this is able to curve in the opposite direction, that is to say downwards and then upwards in the direction towards the outlet.

According to one alternative to the outlet nozzle having a curved form, such that the internal component parts of the turbine, which are hot during operation, are concealed from direct view from the rear, the outlet nozzle can be essentially straight, that is to say it can exhibit a tubular form having a central axis which coincides with the central axis of the jet engine. For example, a concealing structure in the form of a plurality of S-shaped guide rails can be arranged downstream of the turbine for the purpose of concealing the hot component parts of the turbine from view from the rear.

The invention claimed is:

1. An arrangement for propelling an aircraft comprising a jet engine and
an outlet nozzle arranged downstream of the jet engine,
the jet engine being of a type which generates an internal core flow and an external fan flow,
a part of the outlet nozzle having an internal surface which defines a gas duct for the fan flow, wherein the part of the outlet nozzle comprises a wall structure that is arranged at a distance from the internal surface such that it separates the gas duct for the fan flow from an internal gas duct for the core flow, the wall structure being tubular and having an extent in an axial direction of the outlet nozzle, and the internal surface exhibiting a form such that at least one part of the fan flow is deflected, the wall structure comprising a plurality of sleeves that overlap one another in the axial direction of the outlet nozzle and the outlet nozzle comprises a structural part that comprises the internal surface, the structural part being formed of a composite material,
wherein the wall structure is designed to absorb thermal loadings, the structural part, which comprises the internal surface, is designed to absorb mechanical loadings during operation.

2. The propulsion arrangement as claimed in claim 1, wherein the wall structure is of a single-wall type.

3. The propulsion arrangement as claimed in claim 1, wherein a cross section through the internal surface of the part of the outlet nozzle, perpendicular to the axial direction of the jet engine, exhibits a different form, size and/or position in two mutually separate positions in the axial direction of the jet engine.

4. The propulsion arrangement as claimed in claim 1, wherein an inner surface of the outlet nozzle part has a form which curves in relation to the axial direction of the jet engine.

5. The propulsion arrangement as claimed in claim 1, wherein the outlet nozzle has such a shape that internal parts of the jet engine, which are hot during operation, are at least substantially concealed from view from the rear through an outlet of the outlet nozzle.

6. The propulsion arrangement as claimed in claim 1, wherein the wall structure has an extent such that its external surface is essentially parallel to the internal surface of the outlet nozzle part.

7. The propulsion arrangement as claimed in claim 1, wherein the wall structure comprises at least one through hole from the gas duct for the fan flow to the gas duct for the purpose of cooling the wall structure.

8. The propulsion arrangement as claimed in claim 1, wherein the wall structure is so arranged that a cross-sectional area through the gas duct for the fan flow reduces successively in a direction of the outlet from the outlet nozzle.

9. The propulsion arrangement as claimed in claim 1, wherein the internal surface of the outlet nozzle part has an essentially circular cross-sectional form at a gas inlet to the gas duct.

10. The propulsion arrangement as claimed in claim 1, wherein an inner surface of the outlet nozzle part has an elongated cross-sectional form at an outlet from the gas duct.

11. An aircraft comprising a propulsion device as claimed in claim 1.

12. An outlet nozzle for a jet engine and arranged for positioning downstream of the jet engine, the outlet nozzle comprising
a duct for conducting a gas emerging from the jet engine, which duct exhibits a gas inlet and a gas outlet, in conjunction with which one part of the outlet nozzle comprises an internal surface which defines the gas duct, wherein the part of the outlet nozzle comprises a wall structure that is arranged at a distance from the internal surface such that it separates an external gas duct in a radial direction for a fan flow emerging from the jet engine from an inner gas duct in a radial direction for a core flow emerging from the jet engine, the wall structure being tubular and having an extent in an axial direction of the outlet nozzle, and an inner surface of the outlet nozzle has a form such that at least one part of the gas issuing from the jet engine is diverted, wherein the wall structure is designed to absorb thermal loadings, and a structural part, which comprises the internal surface, is designed to absorb mechanical loadings during operation, the wall structure comprising a plurality of sleeves that overlap one another in the axial direction of the outlet nozzle and the outlet nozzle comprises the structural part that comprises the internal surface, the structural part being formed of a composite material.

13. The outlet nozzle as claimed in claim 12, wherein the wall structure is of a single-wall type.

14. The outlet nozzle as claimed in claim 12, wherein a cross section through the internal surface of the part of the outlet nozzle perpendicular to its axial direction at the gas inlet exhibits a different form, size and/or position in two mutually separate positions in the axial direction of the jet engine.

15. The outlet nozzle as claimed in claim 12, wherein the inner surface of the outlet nozzle part has a form which curves in relation to its axial direction at the gas inlet.

16. The outlet nozzle as claimed in claim 12, wherein the outlet nozzle has such a shape that the gas inlet is at least substantially concealed from view from a rear through an outlet of the outlet nozzle.

17. The outlet nozzle as claimed in claim 12, wherein the wall structure has an extent such that its external surface is substantially parallel to the internal surface of the part of the outlet nozzle.

18. The outlet nozzle as claimed in claim 12, wherein the wall structure comprises at least one through hole from the gas duct for the fan flow to the gas duct for the core flow for the purpose of cooling the wall structure.

19. The outlet nozzle as claimed in claim 12, wherein the wall structure is executed in such a way that a cross-sectional area through the gas duct for the fan flow reduces successively in a direction of the outlet from the outlet nozzle.

20. The outlet nozzle as claimed in claim 12, wherein the internal surface of the outlet nozzle part has an essentially circular cross-sectional form at the gas inlet to the gas duct.

21. The outlet nozzle as claimed in claim 12, wherein the internal surface of the outlet nozzle part has an elongated cross-sectional form at an outlet from the gas duct.

22. An aircraft comprising an outlet nozzle as claimed in claim 12.

* * * * *